(12) United States Patent
Daubman et al.

(10) Patent No.: US 9,772,115 B2
(45) Date of Patent: *Sep. 26, 2017

(54) INTELLIGENT THERMOSTAT CONTROL SYSTEM

(71) Applicant: International Business Machines Corporation, Armonk, NY (US)

(72) Inventors: Michael S. Daubman, Poughkeepsie, NY (US); Jessica P. Doherty, Poughkeepsie, NY (US); Jenny S. Li, Danbury, CT (US); Maura K. Schoonmaker, Highland, NY (US); Tina M. Tarquinio, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,114

(22) Filed: Nov. 11, 2016

(65) Prior Publication Data
US 2017/0074540 A1 Mar. 16, 2017

Related U.S. Application Data

(63) Continuation of application No. 15/068,921, filed on Mar. 14, 2016, now Pat. No. 9,574,786, which is a continuation of application No. 14/103,270, filed on Dec. 11, 2013.

(51) Int. Cl.
F24F 11/00 (2006.01)
G05D 23/19 (2006.01)
(Continued)

(52) U.S. Cl.
CPC ........ *F24F 11/0034* (2013.01); *F24F 11/001* (2013.01); *F24F 11/006* (2013.01);
(Continued)

(58) Field of Classification Search
CPC .......... F24F 11/0034; F24F 2011/0068; F24F 11/0076; F24F 11/006; F24F 11/0086;
(Continued)

(56) References Cited

U.S. PATENT DOCUMENTS 6,502,758 B2 * 1/2003 Cottrell .............. G05D 23/1904
236/46 R
8,024,073 B2 * 9/2011 Imes ...................... H04L 67/42
700/19

(Continued)

*Primary Examiner* — Ramesh Patel
(74) *Attorney, Agent, or Firm* — Cantor Colburn LLP; William A. Kinnaman, Jr.

(57) ABSTRACT

An intelligent thermostat control system for a building, such as a residential home, that automatically adjusts a thermostat setting in the home based on real-time data continually received from mobile devices and/or social media files associated with the residents. This allows the thermostat controller to override the explicit programmed settings with implicit settings based on activity analysis taking the actual locations and schedules of the residents into account. The intelligent thermostat controller may control different zones differently to take into account the schedules and locations of specific residents associated with specific zones. The temperature controller may also adaptively learn a number of parameters based on monitored data, such as travel times and heating/cooling times for the zones based, to determine times for adjusting the thermostats.

1 Claim, 3 Drawing Sheets

(51) Int. Cl.
*H04L 12/28* (2006.01)
*G05B 13/02* (2006.01)
*G05B 15/02* (2006.01)
*H04W 4/02* (2009.01)
*H04W 4/04* (2009.01)
*H04L 29/08* (2006.01)
*H04M 1/725* (2006.01)

(52) U.S. Cl.
CPC ...... *F24F 11/0076* (2013.01); *F24F 11/0086* (2013.01); *G05B 13/0265* (2013.01); *G05B 15/02* (2013.01); *G05D 23/1905* (2013.01); *H04L 12/2816* (2013.01); *H04L 12/2823* (2013.01); *H04W 4/02* (2013.01); *F24F 2011/0035* (2013.01); *F24F 2011/0036* (2013.01); *F24F 2011/0063* (2013.01); *F24F 2011/0064* (2013.01); *F24F 2011/0068* (2013.01); *F24F 2011/0071* (2013.01); *G05B 2219/2614* (2013.01); *G05B 2219/2642* (2013.01); *H04L 67/12* (2013.01); *H04M 1/72533* (2013.01); *H04W 4/043* (2013.01)

(58) Field of Classification Search
CPC ............. F24F 11/001; F24F 2011/0063; F24F 2011/0036; F24F 2011/0064; F24F 2011/0071; F24F 2011/0035; H04L 12/2816; H04L 12/2823; H04L 67/12; G05D 23/1905; H04W 4/02; H04W 4/043; G05B 15/02; G05B 2219/2614; G05B 13/0265; G05B 2219/2642; H04M 1/72533
See application file for complete search history.

(56) References Cited

U.S. PATENT DOCUMENTS

| | | | | |
|---|---|---|---|---|
| D655,210 S | * | 3/2012 | Narayanamurthy | D10/49 |
| 9,115,908 B2 | * | 8/2015 | Shetty | F24F 11/006 |
| 9,574,786 B2 | * | 2/2017 | Daubman | F24F 11/001 |
| 2004/0117330 A1 | * | 6/2004 | Ehlers | F24F 11/0012 705/412 |
| 2005/0040247 A1 | * | 2/2005 | Pouchak | G05D 23/1905 236/44 C |
| 2005/0046584 A1 | * | 3/2005 | Breed | B60C 11/24 340/13.31 |
| 2010/0163633 A1 | * | 7/2010 | Barrett | B60H 1/00871 236/49.3 |
| 2011/0238222 A1 | * | 9/2011 | Nikovski | F24F 11/006 700/276 |
| 2012/0026004 A1 | * | 2/2012 | Broniak | E03B 7/075 340/870.02 |
| 2012/0165993 A1 | * | 6/2012 | Whitehouse | G05D 23/1904 700/278 |
| 2012/0191257 A1 | * | 7/2012 | Corcoran | H04L 12/2818 700/278 |
| 2012/0253523 A1 | * | 10/2012 | Harrod | F24F 11/0086 700/276 |
| 2012/0259470 A1 | * | 10/2012 | Nijhawan | G05D 23/1934 700/278 |
| 2013/0325190 A1 | * | 12/2013 | Imes | F24F 11/0012 700/276 |
| 2014/0058567 A1 | * | 2/2014 | Matsuoka | G05D 23/1917 700/276 |
| 2014/0277769 A1 | * | 9/2014 | Matsuoka | G06Q 50/06 700/278 |
| 2015/0159893 A1 | * | 6/2015 | Daubman | F24F 11/001 700/278 |

* cited by examiner

INTELLIGENT THERMOSTAT CONTROL SYSTEM

CROSS-REFERENCE TO RELATED APPLICATIONS

The present application is a continuation application of U.S. patent application Ser. No. 14/103,270 filed on Dec. 11, 2013 and U.S. patent application Ser. No. 15/068,921 filed on Mar. 14, 2016. The entire contents of U.S. patent application Ser. No. 14/103,270 and U.S. patent application Ser. No. 15/068,921 are incorporated herein by reference.

TECHNICAL FIELD

The present invention relates to thermostats for buildings and, more particularly, to intelligent thermostat controllers.

BACKGROUND

Many homes have programmable thermostats that allow a user to enter multiple settings for running the heat, ventilation and air conditioning (HVAC) systems to match the expected occupancy patterns of the residents to save energy. Most homes also have multiple zones with dedicated HVAC units, each having a separate programmable thermostat. It is generally appropriate to heat or cool different zones on different schedules to save energy. In some homes, for example, it may be appropriate to heat and cool the main living zone during waking hours, while the bedroom zone can be heated and cooled during sleeping hours. It may also be advantageous to turn the thermostats well down (i.e., turn the heating temperature setting up and the air conditioning temperature down) whenever the residents are scheduled to be away from home for extended periods, for example during weekday working hours. The thermostats can be programmed to automatically adjust to more comfortable settings when the residents are scheduled to return home. There may also be special events, such as vacations, when the entire family is away from home for extended periods. When the entire family is away from the home, energy can be saved by turning the thermostats well down for the duration of their absence.

In general, more accurate thermostat programming reflecting the actual occupancy of the residents can save energy, but few homeowners remember to adjust the thermostat as frequently as schedules change. And even if a homeowner were to endeavor to set the thermostats daily to reflect the expected occupancy schedules of the residents, the thermostat settings might still turn out to be less then optimal, at least on some occasions, due to unexpected changes in the schedules.

SUMMARY

According to one embodiment of the present invention, a thermostat control system is provided. The thermostat control system includes a thermostat controller receptive of first location and schedule information and operative to adjust at least one thermostat within a building. The thermostat controller accesses second location and schedule information of a social media file associated with a resident of the building if the first location and schedule information are not received periodically, adaptively learns a predicted heating/cooling time for the building, adjusts the thermostat based on the adaptively learned heating/cooling time, on the first location and schedule information and on the second location and schedule information and records historical data files for explicit thermostat setting data related to preprogrammed settings entered into the thermostat and implicit thermostat setting data determined from analyses of users locations and schedules, direct thermostat setting data, first location and schedule data, second location and schedule data and resident and zone occupancy data.

According to one aspect of an embodiment invention, the intelligent thermostat controller receives location and/or schedule information for multiple residents of the building. Different residents may be associated with different zones that each have separate thermostat settings. The thermostat controller performs the activity analysis for multiple residents and multiple zones to determine the implicit thermostat settings for the different zones and adjusts the thermostat settings for the zones accordingly.

According to another aspect of an embodiment invention, the intelligent thermostat controller adaptively learns parameters, such as travel times and heating/cooling times for the zones of the building, based on monitored data received over time. The timing for adjusting to the implicit thermostat settings is then set based on the location and/or schedule data for the residents together with the learned parameters.

Additional features and advantages are realized through the techniques of the present invention. Other embodiments and aspects of the invention are described in detail herein and are considered a part of the claimed invention. For a better understanding of the invention with the advantages and the features, refer to the description and to the drawings accompanying figures.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present invention may be realized in an intelligent thermostat control system for a building, which is described as a residential home in the examples described below. The home may have multiple residents and multiple independently controlled heating, ventilation and air conditioning (HVAC) zones with separate programmable thermostats. Although many homes have multiple zones, embodiments of the invention may be applied to single zone HVAC systems if desired. In addition, while the embodiments described below are directed to a residential home, the same principles may be applied to commercial, industrial and any other temperature controlled location.

Figure 1:
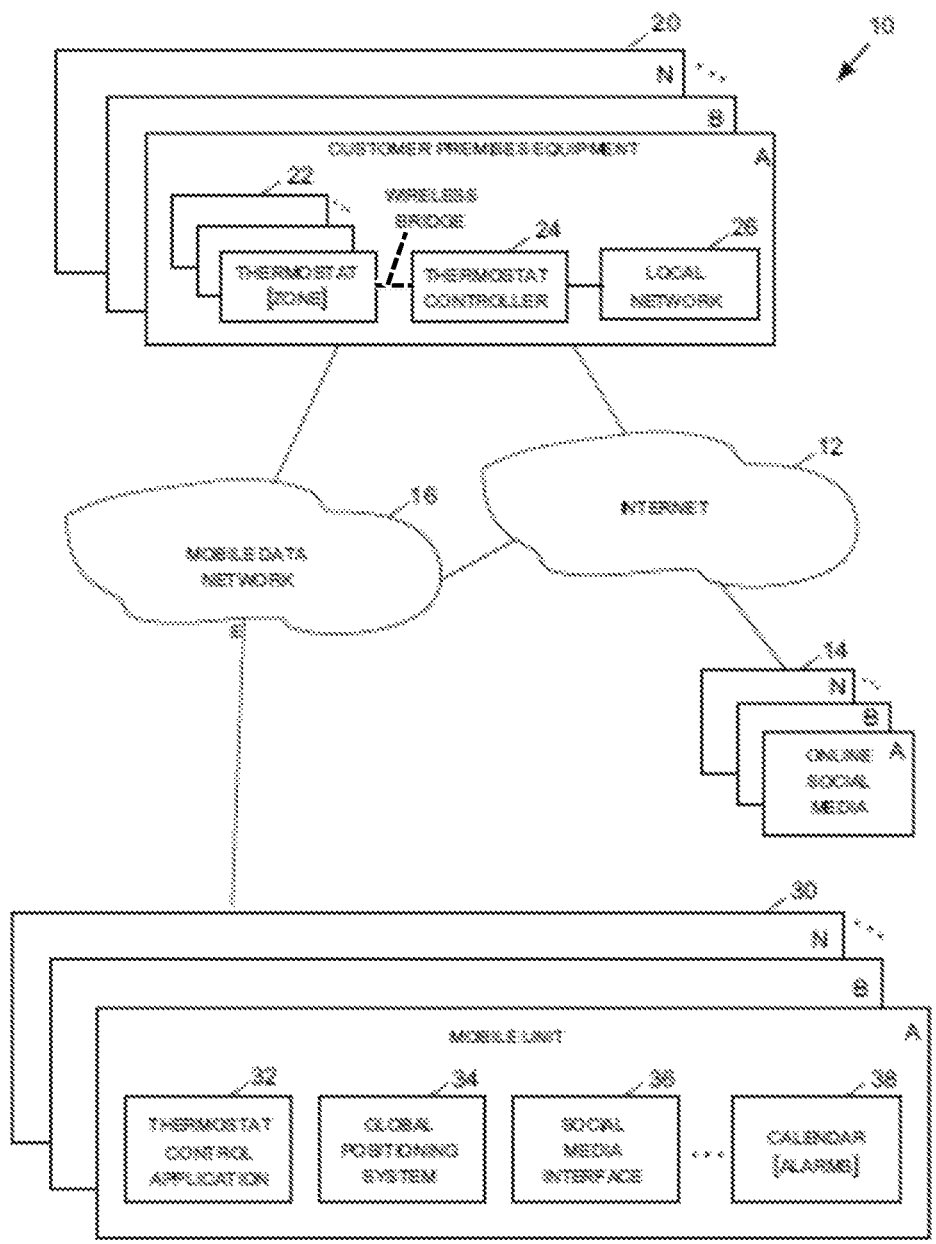
FIG. 1 is a block diagram for an intelligent thermostat control system.

With reference now to FIG. 1, an intelligent thermostat control system 10 includes a thermostat controller 24 forming part of the customer premises equipment 20A in a building. In this example, the building is a residential home that serves to represent one of many homes and other buildings that may have similar customer premises equipment 20A-20N. The thermostat controller may be configured with "contact profiles" containing network and contact information for downloading the location and schedule information for each resident. In general, sources of location and schedule information include mobile units (e.g., cellular telephones, tablets, etc.) and social media files (e.g., Facebook®, Twitter®, LinkedIn®, etc.) associated with the residents. In this particular example, the thermostat controller 24 utilizes the Internet 12 to functionally connect with online social media files 14A-14N associated with the residents of the home.

A social media "location tracking" option typically allows a user's social media file to track the location of the associated resident's mobile unit, which allows location data as well as schedule data to be obtained from the social media file. Alternatively or in addition, the thermostat controller 24 may utilize a mobile data network 16 to connect directly with the mobile units 30A-30N associated with multiple residents of the home. The mobile units typically maintain location data for the unit and may also maintain schedule data, such as calendars and alarms. Some users may prefer to keep their schedule in their mobile unit rather than a social media file. For these users, the thermostat controller 24 utilizes a mobile data network 16 to communicate directly with the user's mobile unit.

The customer premises equipment 20A includes the thermostats 22 for one or more HVAC zones and the thermostat controller 24, which may be connected to a local home-area network 26. The thermostat controller 24 intelligently adjusts the programmed settings of the thermostats 22 based on monitored schedule and location data for multiple residents obtained from the mobile devices and social media files associated with the residents. To do so, the thermostat controller 24 communicates over one or more networks, such as the Internet 12 and the wireless data network 16, with online social media files 14A-14N and mobile units 30A-30N associated with the residents. In some cases, the social media files 14A-14N may include location and schedule information for the residents entered by the residents or communicated from the mobile units to the social media files. In other cases, the mobile units may be the best resource for obtaining the schedule and location data. Depending on the preference of the specific users, the thermostat controller 24 may access location and schedule information from mobile units, social media files, or both, as appropriate for different users. The thermostat controller 24 may also access these resources in a priority order. For example, the thermostat controller may be configured to receive data periodically from a user's mobile unit, and resort to accessing the user's social media whenever the mobile unit does not report at the expected intervals.

Referring to the mobile unit 30A to provide an illustrative example, alternatively or in addition to accessing a resident's social media files, the temperature controller 24 may directly access the resident's mobile unit. To facilitate this connectivity, this mobile unit includes a thermostat control application or "app" 32 configured to autonomously communicate with the thermostat controller 24. The app periodically reports location and schedule data to keep the thermostat controller 24 apprised of the current location and schedule information maintained on the mobile unit. The mobile unit typically includes programs with schedule information, such as a calendar, alarm, or a mail program with scheduling functionality. The mobile unit may also include a social media interface 36 that provides location information, schedule information or both to the resident's social media file.

Figure 2:
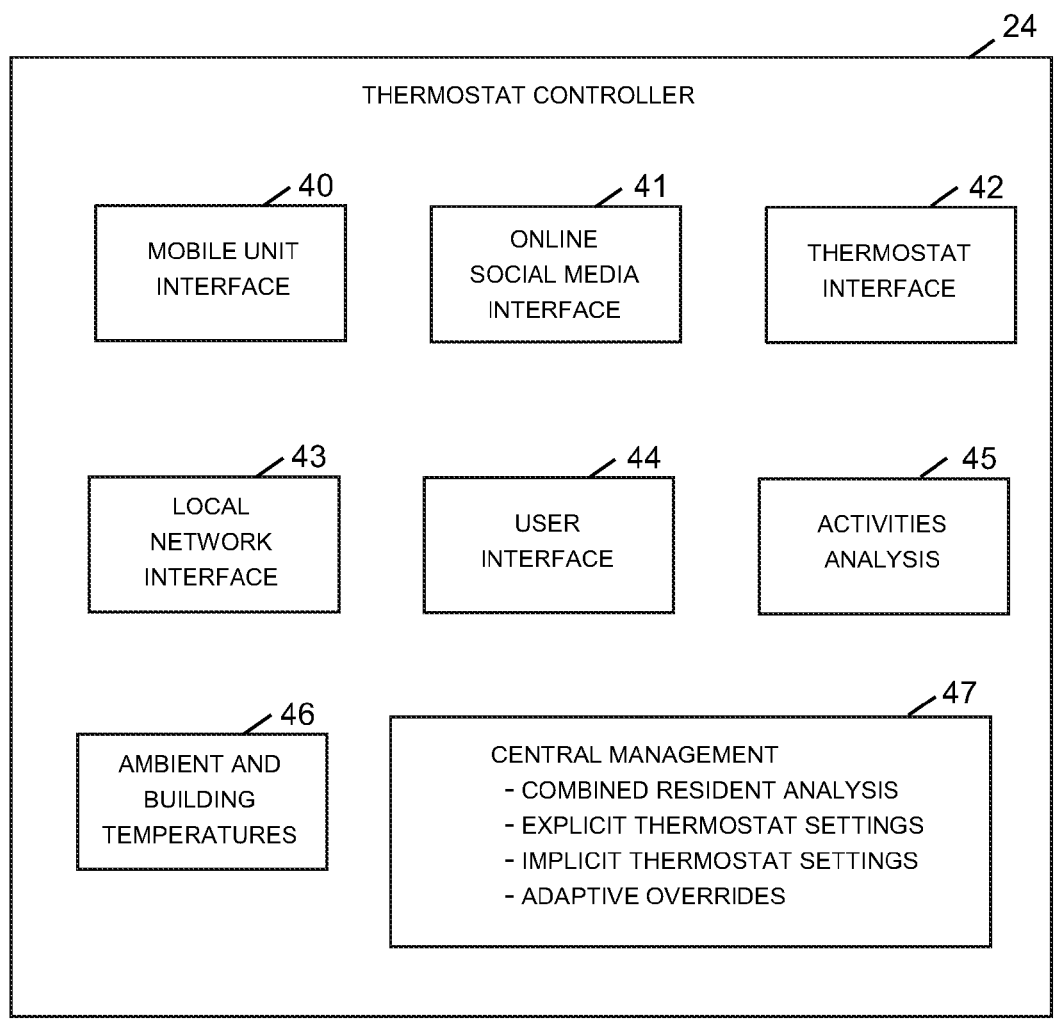
FIG. 2 is a block diagram for a thermostat controller for the intelligent thermostat control system.

FIG. 2 is a block diagram of an example thermostat controller 24, which typically includes a mobile unit interface 40 configured to communicate via a mobile data network with the thermostat control app 32 on each resident's mobile unit. The mobile data interface may implement a "pull" model in which the mobile unit interface 40 requests data downloads from the app according to a schedule set by the mobile unit interface. Alternatively, the mobile data interface for the thermostat controller 24 may implement a "push" model in which the app automatically sends data according to a schedule set by the app. The push model may be advantageous, for example, by allowing the mobile unit to initiate or increase the frequency of data updates when the underlying schedule or location data experiences a change. For example, a schedule or alarm change may cause a data update, and the frequency of data updates may increase when the location of the mobile unit is changing. The push model may also reduce the frequency of data updates in response to low battery and low signal strength conditions at the mobile unit. In either case, the mobile unit interface 40 at the thermostat controller 24 continually receives schedule and location updates from the thermostat control app running on the mobile unit 32.

The thermostat controller 24 may also include an online social media interface 41 that communicates via the Internet with each resident's online social media file 14. This may provide a backup, or in some cases a less expensive communication interface, for users who maintain schedule and location data in their social media files. A thermostat interface 42 controls the thermostat 22, which may represent multiple thermostats controlling separate thermostats for different zones in the building. Although any type of connection may be utilized, a wireless bridge may be suitable for connecting the thermostat interface 42 with the thermostat 22. A local network interface 43 may also be provided to integrate the thermostat controller with a home area network or other local network present in the building, which may provide connectivity to the thermostat 22.

The thermostat controller 24 also includes a user interface 44, which may typically be accessed from a laptop computer, mobile device or other remote computer allowing a user to conveniently program and obtain information from the thermostat controller. For example, the user interface 44 may be used to create and activate explicit setting profiles for programming the thermostats in the building, associate particular residents with specific zones, and create mobile unit and social media contact information profiles for the residents. The user interface 44 may also be used to set various parameters utilized by the thermostat controller, such as thermostat setting parameters and network interface parameters. It may also be used to activate mobile devices for use with the system, activate social media files for use with the system, and so forth.

A variety of parameters may be provided for administrative control by an authorized user, such as maximum heating temperatures, minimum cooling temperatures, override and interrupt hold periods, contact information for sending alerts to a system administrator, network interface parameters, parameters used in activity analysis, and the like. The thermostat controller may also record and create historical data files for a variety of parameters, such as explicit thermostat setting data, implicit thermostat setting data, direct thermostat setting data, resident location data, resident schedule data, resident occupancy data, zone occupancy data, mobile device information reporting data, social media information reporting data, and so forth.

The thermostat controller 24 also includes an activity analysis feature 45, which determines when to replace the explicit thermostat settings with implicit settings based on mobile unit locations, schedule data, travel patterns, predicted travel times, and predicted heating/cooling times required to bring HVAC zones to desired temperatures. The thermostat controller 24 may utilize ambient and building temperatures 46 to predict the heating/cooling times required to bring HVAC zones to desired temperatures. Activity analysis may also adjust the thermostat settings based on location data, schedule data, or a combination of location and schedule data. In particular, activity analysis may use location data, schedule data, and learned parameters such as predicted travel times and temperature response data for the HVAC zones to adjust the thermostat settings sufficiently in advance of the projected arrival of the resident so that the appropriate zone temperatures have reached comfortable settings when the resident arrives at the home.

While many thermostat adjustment triggers may be defined, the combination of a resident's schedule indicating that a scheduled activity has ended together with location information indicating that the resident is traveling in a manner consistent with returning home will ordinarily trigger heating or cooling one or more zones of the residence in time for their return. For example, the activity analysis my prevent a thermostat from adjusting from an energy saving setting to a comfortable setting when the activity analysis determines that the resident is at a restaurant located 30 minutes away from the home. Once the activity analysis determines that the resident is headed home, the thermostat may be adjusted to the comfortable setting about 15 minutes before the resident arrived. An unscheduled return to the residence may also trigger heating or cooling the residence as a resident approaches or arrives at the residence. Learned parameters regarding resident activity, travel times, and zone heating/cooling response may also be factored into the timing of the adjustments to the implicit thermostat settings.

The activities analysis feature 45 may work in conjunction with a central management feature 47, which keeps track of the explicit thermostat settings for the various zones and combines the activity analyses for multiple residents to determine implicit settings for the thermostats in the various zones. Centralized management allows the temperature controller to take into account the activity analyses for multiple residents and the association of different residents with different HVAC zones in the residence. Over time, the activities analysis and central management features may adapt to reflect learned parameters gained by monitoring the schedules, travel times and heating/cooling response of the various zones in the building over time. The system may also adapt to learned behaviors of the residents, such as recurring travel and activity patterns not reflected in the configured schedule data. This allows the activity analysis and central management features to adapt the thermostat control procedures to learned parameters in an ongoing process to proactively adjust the thermostat settings to provide comfortable living conditions while minimizing energy usage.

Of courts, the activity of the residents will sometimes vary unpredictably from their planned schedules, residents may forget or misplace their mobile units, residents may not program all of their planned activities into their mobile units or social media files, and other events may occur that unexpectedly vary the occupancy pattern of the residence. To account for these types of situations, the thermostat controller allows interrupt settings, such as those entered directly into a thermostat, to override the explicit (preprogramed) settings as well as the implicit settings determined by the thermostat controller through activities analysis. The thermostat controller therefore operates according to predefined explicit settings (i.e., the conventional programmed settings entered into the programmable thermostat) that can be overridden by implicit settings determined through activity analysis for the residents based on the location and schedule information received from their mobile devices and social media. The explicit settings as well as the implicit may also be overridden by interrupt settings directly entered into the thermostats. In this manner, the intelligent thermostat controllers more efficiently meet the needs of the residents by automatically adjusting thermostat settings based on monitored locations, activities, and schedules of the residents, while still allowing the residents to interrupt the programming through manual thermostat adjustment when needed.

Figure 3:
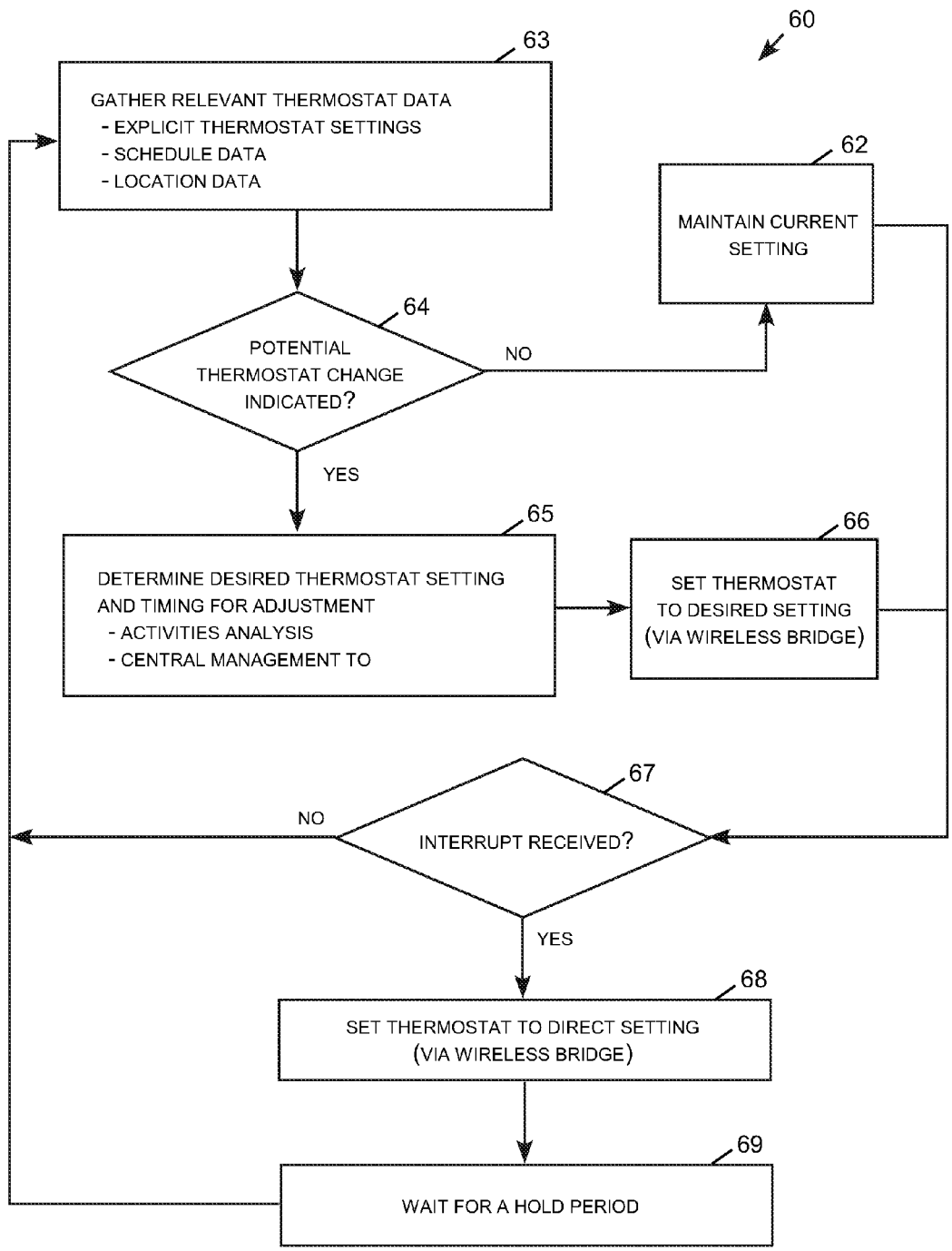
FIG. 3 is a logic flow diagram for a computer-implemented routine for operating the thermostat controller for the intelligent thermostat control system.

FIG. 3 is a logic flow diagram for an example routine 60 for operating the thermostat controller 24 for a representative thermostat. It will be understood that multiple thermostats may be controlled in a similar manner for multiple HVAC zones in the building. In block 62, the controller initially sets the thermostat to the explicit setting or maintains the current setting in the absence of a determination to alter or override the current setting. In the absence of an interrupt at block 67, the routine advances to block 63, where the controller gathers relevant data, typically including information obtained from the user interface (e.g., explicit thermostat settings that may change from time to time), information obtained from the mobile units (e.g., location information for the residents), and information obtained from social media (e.g., scheduled activity data for the residents). The routine 60 proceeds from block 63 to decision block 64, in which the controller determines whether the gathered information indicates that a thermostat change may be indicated. For example, the gathered data may indicate that one of the residents has varied from a predefined schedule or is traveling toward the residence. If the gathered data does not indicate a potential thermostat change, the "no" branch is followed from decision block 64 to block 62, in which the thermostat maintains the current thermostat setting, which may be an explicit setting, an implicit setting or an interrupt setting.

If the gathered data indicates a potential thermostat change, the "yes" branch is followed from decision block 64 to block 65, in which the thermostat controller runs the activity analysis to determine a desired thermostat setting typically based on location and schedule data for one or more residents. When determining the desired thermostat setting, the thermostat controller may take into account the explicit setting preset for the thermostat as well as implicit settings determined for multiple residents based on activity analysis. For example, the activity analysis for each resident may include their current location, their recent locations (e.g., whether they are traveling toward the residence), and their schedule as determined from their location and schedule data. The temperature controller may also consider learned parameters, such as travel times from various locations and heating/cooling times for the various zones of the building based on ambient and building temperature measurements. The routine 60 then proceeds from block 65 to block 66, in which the thermostat controller sets the thermostat to the determined setting typically via a wireless bridge between the thermostat controller and the thermostat.

An interrupt reflecting a directly entered thermostat setting may be received at any time, as indicated by decision block 67 which follows both block 62 and block 66. An interrupt indicates that a user has taken an affirmative step to directly set the temperature, for example by manually adjusting a thermostat to a desired temperature. If an interrupt has been received, the "yes" branch is followed from decision block 67 to block 68, in which the temperature controller sets the thermostat to the direct setting, which may also use the wireless bridge between the thermostat controller and the thermostat. The routine 60 then proceeds from block 68 to block 69, in which the temperature controller waits for a preset hold period, which may be a user configurable parameter. After waiting the prescribed time, the routine 60 returns to block 63, in which the temperature controller gathers relevant data. On the other hand, if an interrupt has not been received at decision block 67, the "no" branch is followed back to block 63, in which the temperature controller gathers relevant data, and the routine continues as previously described.

While conventional programmable thermostats are typically capable of being programmed on any desired frequency, most people program their thermostats once or at most occasionally. A typical homeowner may initially program the thermostat with seasonal settings based on expected occupancy of the residence and then fail to make any further adjustments as schedules change. As a result, the thermostat programs are often set without attempting to follow the daily schedules of the residents as those schedules vary over time. And even if the residents were to program thermostat on a daily basis, their actual schedules would often vary from their expected schedules. At present, there is no convenient way for a homeowner to reprogram the thermostat as schedules change. Conventional programmable thermostats also lack the ability to take into account varying scheduled for multiple residents, some of whom may be associated with specific zones, when establishing the thermostat settings.

The intelligent thermostat controller solves this problem by automatically adjusting the thermostat setting based on real-time data continually received from mobile devices and social media files associated with the residents. This allows the thermostat controller to override the explicit programmed settings with implicit settings based on activity analysis taking the actual locations and schedules of the residents into account. The real-time location and schedule data may be obtained over the Internet or via a mobile data network from the residents' mobile devices and social media files. The intelligent thermostat controller may also control different zones differently to take into account the schedules and locations of specific users associated with specific zones. For example, the thermostat setting for an apartment zone may be adjusted when a person associated with that zone is determined to be present or in the process of returning to the home. As another example, the thermostat controller for a home office or workshop zone may be adjusted when a specific person associated with that zone is determined to be present or in the process of returning to the home. It will be appreciated, of course, that many different thermostat control schemes may be defined by individual users based on the needs of their households, which will vary from household to household.

While mobile devices (e.g., cellular telephones) are described as the location determining devices carried by the relevant persons, other types of location or presence determining devices may utilized. For example, the intelligent thermostat control system may work with RFID identification cards, entry control systems, position reporting devices, cameras, automatic lighting systems, infrared sensors or other type of systems for detecting the presence of persons within the building. The system may also use additional types of inputs to implement thermostat overrides, for example automatically adjusting the thermostat whenever a specific light switch or other piece of equipment is turned or off. The embodiments described above provide simple examples to illustrate the principles of the innovation and many other options, alternatives and levels of sophistication will become apparent to those skilled in the art once the basic principles of the innovation have been ascertained based on the specific examples provided.

As an option, the intelligent thermostat control system may be implemented as part of a home area network, which may provide connectivity to the thermostats. Whether deployed independently or as part of a larger computer network, the thermostat control system may be configured to intelligently control the thermostat settings for multiple zones of the home based on real-time data indicating the locations or schedules for multiple residents of the home. The intelligent thermostat controller may control different zones differently to take into account the occupancy of specific residents associated with specific zones. The thermostat controller may utilize schedule data, location data, or both for each resident. The location and/or schedule data may be received from the resident's mobile unit, social media file, or both as desired. The real-time location and schedule data may be obtained over the Internet and/or via a mobile data network.

In addition, the temperature controller may adaptively learn a number of parameters based on monitored data, such as travel times based on locations and schedule information for the residents, and heating/cooling times for the zones based on ambient and building zone temperatures. For example, the activity analysis may determine predicted travel times from mobile unit locations to the home based on the location, time of day and day of the week. The temperature controller may also adaptively learn activity and travel patterns for the residents. These adaptively learned parameters are then used to determine the times for adjusting the thermostats to the implicit settings. This allows the thermostats to be set to the implicit settings sufficiently in advance to allow the zones to reach the desired temperatures in time for the arrival of the residents.

To provide one simple example to illustrate the basic functionality, an implicit setting based on activity analysis may override a predefined explicit thermostat setting by preventing a change in the temperature setting until the activity analysis determines based on location information or schedule information (or both) that one of the residents is likely on their way home. Similarly, an implicit setting may override an explicit predefined setting by adjusting the thermostat setting to a comfortable setting when the location information indicates that a resident is enroute home. To continue this example, the person's schedule may impact the activity analysis when the person leaves the residence. For example, if that person is scheduled to be at another place, the thermostat may be immediately adjusted to an energy saving setting as soon as they leave the premises. But if that person is scheduled to be home, the temperature controller may maintain the temperature setting at a comfortable setting for a longer period, effectively anticipating that they will return home shortly. Adaptive programming allows the activities analysis to learn behavior patterns based on the combination of location and schedule data over time, allowing for more effective thermostat control as the behavior patterns of the residents are learned over time.

Activity analysis may also be performed, and combined as appropriate, for multiple residents who may be associated with different zones. Schedule data may also be combined with location data, for example to predict that a resident in transit is not headed home, but is instead headed to another appointment. In general, predicted travel times may be based on location data alone, schedule data alone, or a combination of location and schedule data, typically depending on which data is available for a particular resident. Predicted HVAC zone temperature response times may also be taken into consideration, typically based on ambient temperatures, zone temperatures, and learned heating/cooling response times to estimate the times required to adjust the zone temperatures to the desired temperatures. Centralized management allows the temperature settings to be adjusted based on the combined needs of the various residents, while the adaptive programming can learn group behaviors to assist in effective thermostat control.

The intelligent thermostat controller achieves advantages not realized by prior thermostat controllers by intelligently adjusting the thermostat settings based on real-time monitored data, which may include both location and schedule data for the residents. The activities of multiple residents may be considered since, for example, it may be appropriate to adjust the thermostat for a common living zone to a comfortable setting whenever any of the residents are home. In addition, the thermostat settings for different zones may be varied based on the particular residents that are determined to be home at any particular time. As another example, the thermostat setting in an in-law suite, basement apartment or teenager's room may be controlled on based the activity analysis for one or more residents assigned to that particular zone. In yet another example, the thermostat setting in a workshop or home office may be adjusted to a comfortable setting only when a specific resident authorized to use the workshop or office is determined to be present. Similar controls may be defined for exercise rooms, art studios, or other any other special purpose zone within the home. Interrupts for direct thermostat settings may be enabled or disabled for particular zones, residents, times of day and so forth.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The diagrams depicted herein illustrate just one example. There may be many variations to these diagrams or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A thermostat control system, comprising:
    a thermostat controller receptive of first location and schedule information from a control application of a mobile unit via a mobile data network and operative to adjust at least one thermostat within a building,
    wherein the thermostat controller:
    accesses second location and schedule information of a social media file, which is different from the first location and schedule information, and which is associated with a resident of the building if the first location and schedule information are not received periodically,
    adaptively learns a predicted heating/cooling time for the building,
    adjusts the thermostat based on the adaptively learned heating/cooling time, on the first location and schedule information and on the second location and schedule information of the social media file; and
    records historical data files for explicit thermostat setting data related to preprogrammed settings entered into the thermostat and implicit thermostat setting data determined from analyses of users locations and schedules, direct thermostat setting data, first location and schedule data, second location and schedule data and resident and zone occupancy data.

* * * * *